United States Patent
Kind (10) Patent No.: US 6,412,010 B1
(45) Date of Patent: Jun. 25, 2002

(54) APPARATUS AND METHOD FOR IMPLEMENTING A NETWORK PROTOCOL THAT SUPPORTS THE TRANSMISSION OF A VARIABLE NUMBER OF APPLICATION-USABLE OBJECT OVER A NETWORK AS A SINGLE NETWORK TRANSMITTABLE CONTAINER OBJECT AND THE RE-CREATION OF THOSE APPLICATION-USABLE OBJECT THEREFROM

(75) Inventor: Lance Kind, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/335,933

(22) Filed: Jun. 18, 1999

(51) Int. Cl.[7] .............................................. G06F 15/16
(52) U.S. Cl. ........................ 709/230; 717/108; 717/116
(58) Field of Search .......................... 709/230; 717/108, 717/116

(56) References Cited

U.S. PATENT DOCUMENTS 5,737,607 A * 4/1998 Hamilton et al. ............ 709/316
6,249,803 B1 * 6/2001 Jindal et al. ................. 709/203
6,253,256 B1 * 6/2001 Wollrath et al. ............. 709/330
6,260,078 B1 * 7/2001 Fowlow ....................... 709/316
6,272,557 B1 * 8/2001 Lim et al. .................... 709/315
6,298,391 B1 * 10/2001 Kennedy et al. ............. 709/101

OTHER PUBLICATIONS

U.S. Patent application No. 09/336,886; filed Jun. 18, 1999 for Apparatus and Method for a Runtime Method Overloading Resolver of Land Kind.

* cited by examiner

Primary Examiner—Krisna Lim (57) ABSTRACT

A method and apparatus for implementing a network protocol to support the transmission of a variable number of application-usable objects as a single network transmittable container object and the re-creation of the application-usable objects therefrom, which includes marshalling application-usable objects into marshalled objects, where each application-usable objects corresponds to a different marshalled object, and each marshalled object comprises frames of data; creating a two-dimensional array to transmit the application-usable objects, where a first dimension represents a given marshalled object by referencing a second dimension array, and a second dimension array comprises frames of data of a given marshalled object; and storing each marshalled object in the two-dimensional array.

25 Claims, 3 Drawing Sheets

APPARATUS AND METHOD FOR IMPLEMENTING A NETWORK PROTOCOL THAT SUPPORTS THE TRANSMISSION OF A VARIABLE NUMBER OF APPLICATION-USABLE OBJECT OVER A NETWORK AS A SINGLE NETWORK TRANSMITTABLE CONTAINER OBJECT AND THE RE-CREATION OF THOSE APPLICATION-USABLE OBJECT THEREFROM

This application is related to the copending U.S. Application of Lance Kind entitled "METHOD AND APPARATUS FOR A RUNTIME METHOD OVERLOADING RESOLVER", Ser. No. 09/336,886 filed on the same date as the present application, and hereby incorporates by reference all that is disclosed therein.

BACKGROUND OF THE INVENTION

FIELD OF THE INVENTION

This invention pertains to the field of networks, and more particularly to a method and an apparatus for implementing a network protocol that supports the transmission of a variable number of application-usable objects over a network as a single network transmittable container object and the re-creation of those application-usable objects therefrom.

This invention originates from a need to transmit a variable number of application-usable method parameters over a network as a single network transmittable container object from which the application-usable parameters can be re-created. Specifically, this need arises in the context of Java® programming, introduced by Sun Microsystems, Inc., where object serialization can be used to transfer objects between a client and a server for remote method invocation, amongst other functions. In Java's object serialization, an object can be converted into a stream of data that is transmitted over a network, where the stream of data can be converted back into its original object through deserialization. Generally, data streams are transmitted in frames. In Java's serialization, a data stream moves in frames comprising bytes, where each object is stored in an array of bytes. Serialization in the context of remote method invocation is premised on the invocation of a method which has been bound at compile-time, where a method invocation is a pre-compiled object that has been assigned to a specific, pre-determined meaning. As a result, the method invocation can be serialized and transmitted over a network as a single object, which can then be deserialized into its original method invocation object.

As disclosed in the pending U.S. Patent application cited above, however, methods can be bound at runtime instead of compile-time. Unlike compile-time method binding, however, there is no pre-compiled object, and no pre-determined meaning assigned to an event (i.e., selecting an icon or other graphical user interface to generate an event) when a method is bound at runtime. The solution to this, as discussed in the U.S. Patent application referred to herein, is to use Java's Reflection API® (Application Programming Interface) file (hereinafter "Reflection") in conjunction with a runtime method overloading resolver. Reflection comprises a number of classes that allow one to obtain information about any class and its members. (All of Java's objects are part of a class, so Reflection classes comprise methods that can be used to obtain information about a class Circle, that defines methods and variables pertaining to a circle object, for example.)

To implement this solution, a target method (a method associated with a specific event) must be analyzed so that its method signature (method name and method parameters) can be correctly bound to a method implementation defined by a corresponding third party component. To bind a target method to a method implementation in a distributed environment, a target method's signature must be bifurcated such that the method name is transmitted as a single object separately from the method parameters, and the method parameters are transmitted as a single object separately from the method name.

Since the method name is a single object, as there is one method name per method invocation, the method name can be transmitted over a network as a single object and then re-created back into the original method name object using Java's serialization interface. However, if the method parameters are transmitted as a single object, there would be no effective way to re-create each parameter because the way in which the parameters are serialized does not allow deserialization to distinguish one parameter from another.

A need exists, therefore, for implementing a network protocol that supports the transmission of a variable number of application-usable objects over a network as a single network transmittable container object and the re-creation of those application-usable objects therefrom.

SUMMARY OF THE INVENTION

This invention is, in general, directed to method and apparatus for implementing a network protocol that supports the transmission of a variable number of application-usable objects over a network as a single network transmittable container object and the re-creation of those application-usable objects therefrom.

Thus, the invention may comprise an apparatus for implementing a network protocol to support the transmission of a variable number of application-usable objects over a network as a single network transmittable container object and the re-creation of said number of application-usable objects therefrom, comprising a number of computer readable media; and computer readable program code stored on the computer readable media comprising program code for marshalling application-usable objects into marshalled objects, wherein each of the application-usable objects corresponds to a different one of the marshalled objects, and each of the marshalled objects comprises at least one frame of data; program code for creating a two-dimensional array, comprising program code for creating a first dimension array comprising a number of elements, wherein each of the elements of the first dimension array represents a given one of the marshalled objects by referencing a second dimension array comprising a number of elements; and program code for creating the second dimension array, wherein the elements of the second dimension array referenced by a given element of the first dimension array comprise frames of data of a given one of the marshalled objects; and program code for storing each of the marshalled objects in the two-dimensional array.

The invention may also comprise an apparatus for implementing a network protocol to support the transmission of a variable number of application-usable objects over a network as a single network transmittable container object and the re-creation of said number of application-usable objects therefrom, comprising a number of computer readable media; and computer readable program code stored on said number of computer readable media, comprising program code for serializing the application-usable objects into serialized objects, wherein each of the application-usable objects corresponds to a different one of the serialized objects, and each of the serialized objects comprises at least one byte; program code for creating a two-dimensional array of bytes, comprising program code for creating a first dimension array comprising elements, wherein each of the elements of the first dimension array represents a given one of the serialized objects by referencing a second dimension array comprising elements; and program code for creating the second dimension array, wherein elements of the second dimension array referenced by a given element of the first dimension array comprise at least one byte of the given one of the serialized objects, whereby each of the elements of the second dimension array comprises one byte of the given one of the serialized objects; and program code for storing the given one of the serialized objects in the two-dimensional array of bytes.

The invention may also comprise a method for implementing a network protocol to support the transmission of a variable number of application-usable objects over a network as a single network transmittable container object and the re-creation of said number of application-usable objects therefrom, comprising marshalling application-usable objects into marshalled objects, wherein each of the application-usable objects corresponds to a different one of the marshalled objects, and each of the marshalled objects comprises at least one frame of data; creating a two-dimensional array, comprising creating a first dimension array comprising elements, wherein each of the elements of the first dimension array represents a given one of the marshalled objects by referencing a second dimension array comprising elements; and creating the second dimension array, wherein the elements of the second dimension array referenced by the given element of the first dimension array comprise frames of data of the given one of the marshalled objects; and storing the given one of the marshalled objects in the two-dimensional array.

The invention may also comprise a method for implementing a network protocol to support the transmission of a variable number of application-usable objects over a network as a single network transmittable container object and the re-creation of said number of application-usable objects therefrom, comprising creating a two-dimensional array of bytes, comprising serializing application-usable objects into serialized objects, wherein each of the application-usable objects corresponds to a different one of the serialized objects, and each of the serialized objects comprises at least one byte; creating a first dimension array comprising elements, wherein each of the elements of the first dimension array represents a given one of the serialized objects by referencing a second dimension array comprising elements; and creating the second dimension array, wherein the elements of the second dimension array referenced by the given element of the first dimension array comprise bytes of the given one of the serialized objects, whereby each of the elements of the second dimension array comprises one byte of the given one of the serialized objects; and storing the given one of the serialized objects in the two-dimensional array of bytes.

The invention may also comprise an apparatus for implementing a network protocol to support the transmission of a variable number of application-usable objects over a network as a single network transmittable container object and the re-creation of said number of application-usable objects therefrom, comprising means for marshalling said variable number of application-usable objects into a variable number of marshalled objects, wherein each of said variable number of application-usable objects corresponds to a different one of said variable number of marshalled objects, and each of said variable number of marshalled objects comprises at least one frame of data; means for creating a two-dimensional array; and means for storing said given one of said variable number of marshalled objects in said two-dimensional array.

BRIEF DESCRIPTION OF THE DRAWINGS

An illustrative and presently preferred embodiment of the invention is illustrated in the drawings in which.

DESCRIPTION OF PREFERRED EMBODIMENTS

Figure 1:
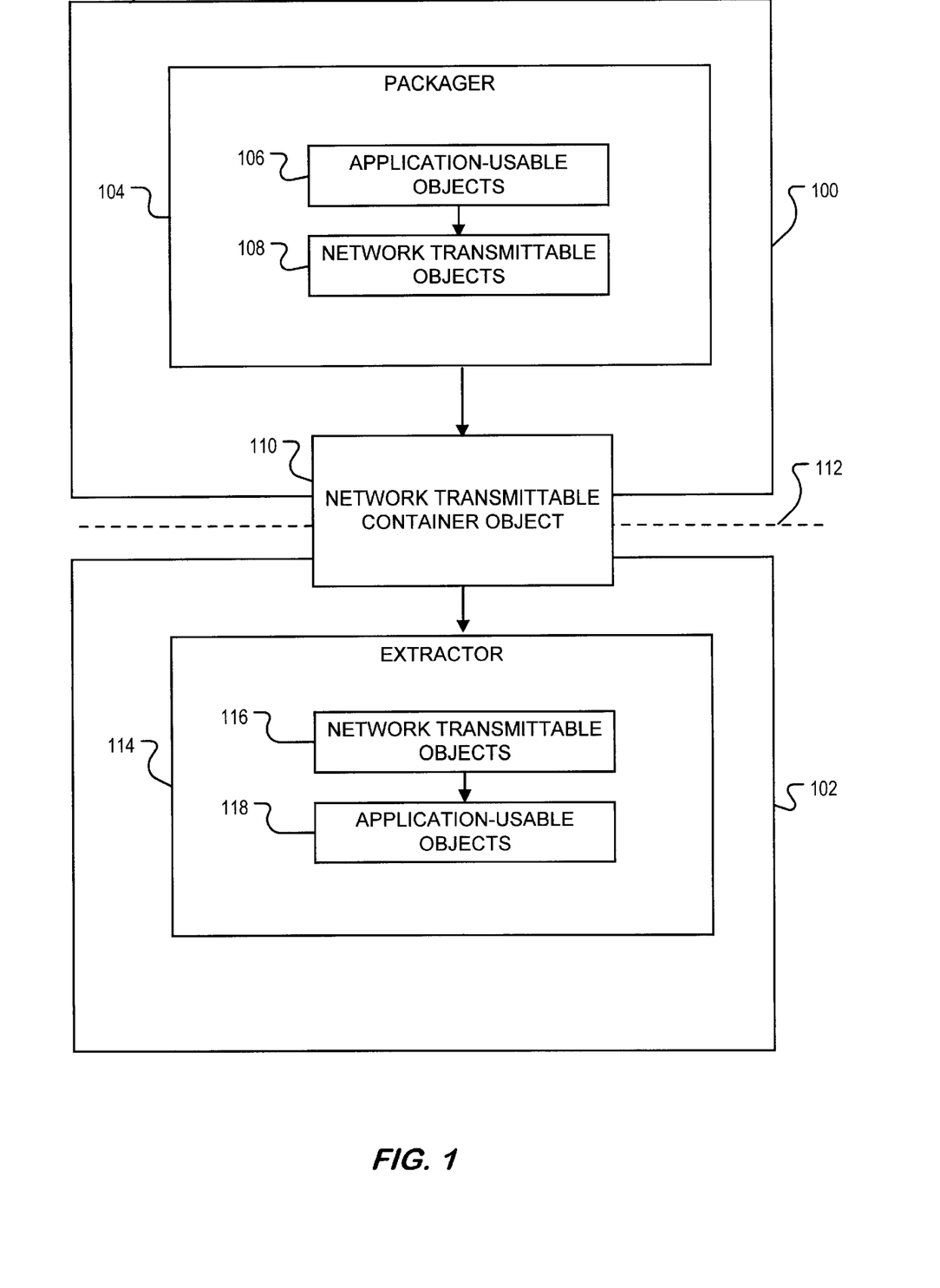
FIG. 1 illustrates an apparatus for implementing a network protocol that supports the transmission of a variable number of application-usable objects over a network as a single network transmittable container object and the re-creation of those application-usable objects therefrom.

FIG. 1, in general, illustrates an apparatus for implementing a network protocol that supports the transmission of a variable number of application-usable objects over a network as a single network transmittable container object and the re-creation of those application-usable objects therefrom. An apparatus for this comprises a Packager 104 on a first computer 100 for converting a variable number of application-usable objects 106 to a number of network transmittable objects 108. A Packager 104 then stores the number of network transmittable objects in a single network transmittable container object 110 that can be transmitted over a network 112 to a second computer 102. The network transmittable container object 110 can be accessed by an Extractor 114 on a second computer 102 for extracting each network transmittable object 116 and for converting each object into an application-usable object 118.

Figure 2:
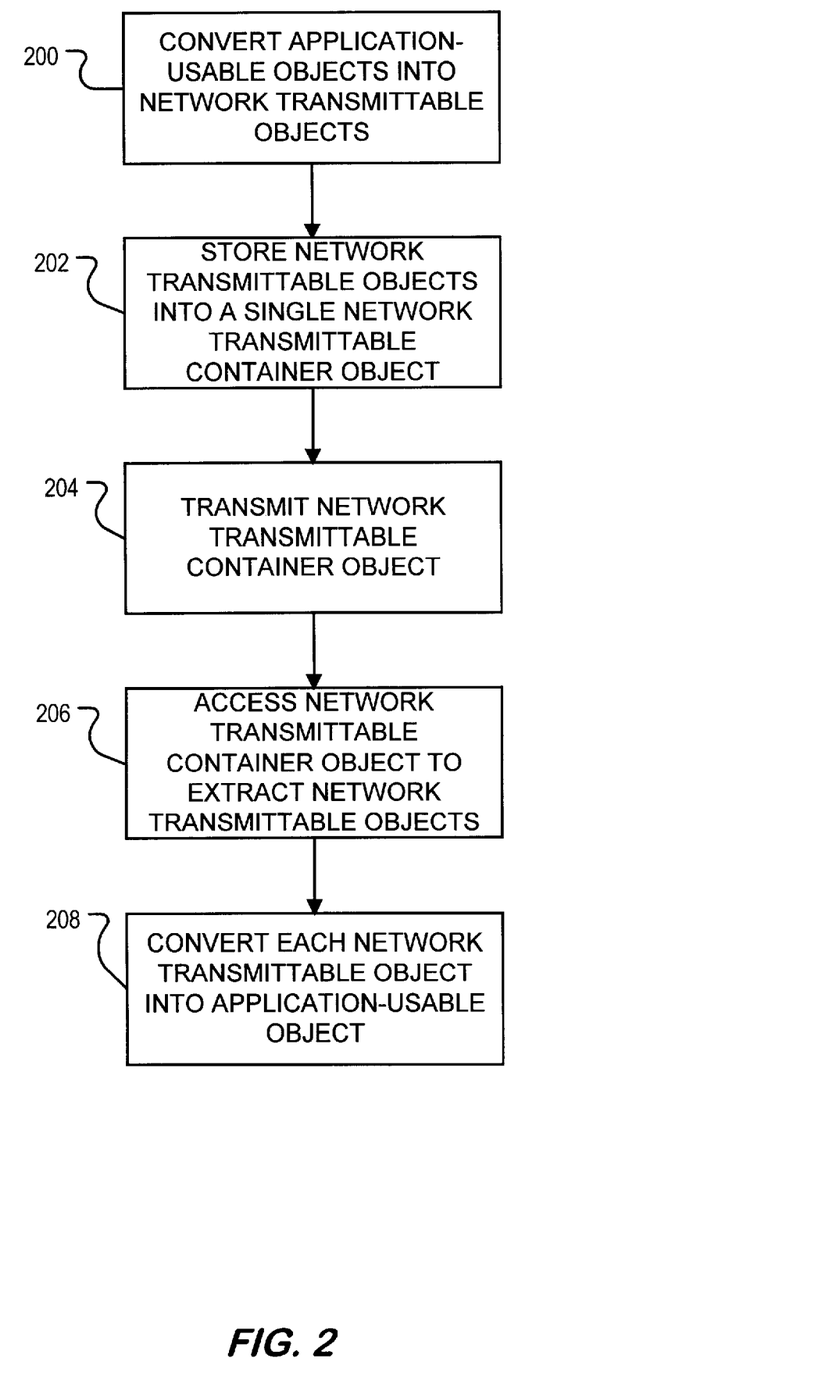
FIG. 2 illustrates a method for implementing a network protocol that supports the transmission of a variable number of application-usable objects over a network as a single network transmittable container object and the re-creation of those application-usable objects therefrom.

FIG. 2, in general, illustrates a method for implementing a network protocol that supports the transmission of a variable number of application-usable objects over a network as a single network transmittable container object and the re-creation of those application-usable objects therefrom. Application-usable objects are converted into network transmittable objects 200, and then stored in a single network transmittable container object 202. The network transmittable container object is then transmitted over a network 204. Once it has been transmitted over the network, the network transmittable container object is accessed, where each object in the network transmittable container object is extracted 206. Each network transmittable object is then converted into an application-usable object 208.

Introduction

This invention originates from a need to resolve method overloading at runtime when a method is invoked remotely. Resolving a method at runtime in a remote environment is implemented in a Hewlett-Packard Company (hereinafter HP) software package called Object-Action Manager®, or ObAM®. Products such as ObAM® are user interface tools that enable rapid prototyping and development of applications through the integration of third party components. In a preferred embodiment, a third party component is a JavaBean® (also referred to as "bean") which is a reusable software component written in Sun Microsystem's Java programming language. JavaBeans® allow easy integration with other components because an application developer essentially only needs to introspect on a bean—i.e., know what properties are exposed by the bean, what methods the bean exports, and what events the bean can generate.

As discussed in the copending application referred to above, third party components may sometimes define multiple method implementations having the same name as a target method. For example, assume that a bean defines three methods named Sort, where each of the three methods sorts an array of integers, floats, and strings, respectively. If method Sort(NameList) is invoked, where Namelist is an array of string, it must be determined whether to invoke Sort(array integer Parm), Sort(array float Parm), or Sort (array string Parm), i.e. method overloading resolution. Since this determination is made when the method is actually invoked by a user (as opposed to making this determination when compiling a program that incorporates a third party component), method overloading resolution is said to be performed at runtime.

To implement runtime method overloading resolution in a distributed environment, a form of remote method invocation is used, whereby a target method associated with an event is serialized on one machine (which in a preferred embodiment is a server), and then transmitted over a network where it is deserialized on a second machine (which in a preferred embodiment is a client). Since this is implemented at runtime, however, where a target method has no corresponding pre-compiled object to be bound to, the method signature of the target method must be bifurcated into a method name object and a method parameters object, so that each object can be serialized, transmitted, and then deserialized into original application-usable objects.

In a preferred embodiment, network transmission is performed using Java's serialization interface. Java's serialization interface takes an application-usable object, converts it to a network transmittable object through serialization (i.e., conversion into a network transmittable array of bytes), and then transmits it over a network as a single network transmittable object. The serialization interface is then able to take the single network transmittable object and re-create an application-usable object by extracting and deserializing the network transmittable object. As a result, when a target method is processed, Java's serialization interface can be used to transmit a method name over a network because there is necessarily one method name for each target method. On the other hand, since there can be a variable number of application-usable objects (where each application-usable object is a parameter), which can vary in type and size, Java's serialization interface cannot be used to transmit method parameters because there is no automated way of deserializing a single network transmittable object back into an original number of application-usable objects. The present invention is a network protocol that addresses this.

Figure 3:
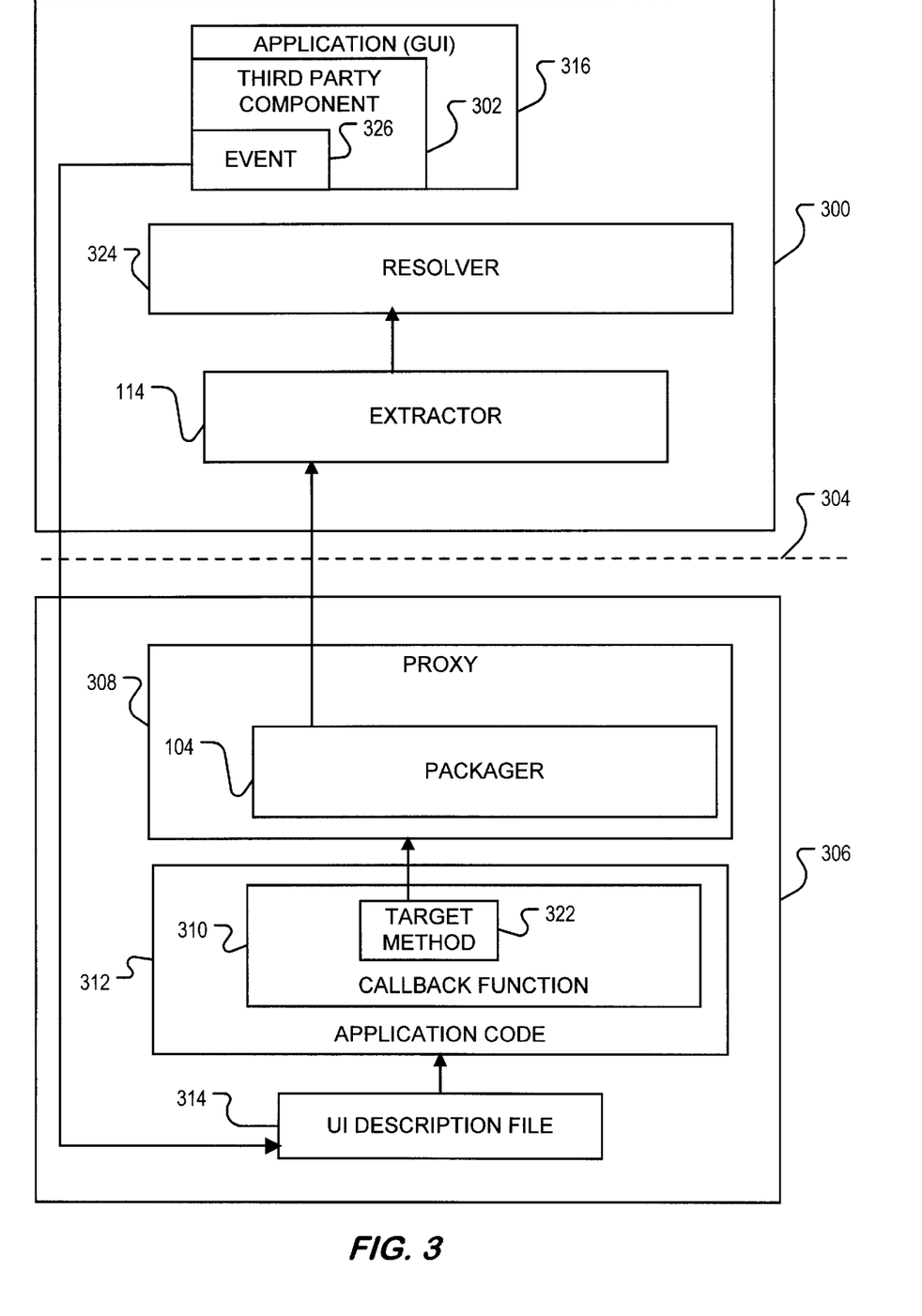
FIG. 3 illustrates an architecture for implementing a network protocol that supports the transmission of a variable number of application-usable objects over a network as a single network transmittable container object and the re-creation of those application-usable objects therefrom.

FIG. 3 illustrates an architecture surrounding the network protocol of the present invention as implemented in a preferred embodiment. The architecture illustrates a client/server environment, wherein an event 326 of a third party component 302 in an application 316 on a client machine 300 is generated, causing application code 312 residing on a server machine 306 to invoke a target method 322 associated with the event 326 in order to produce desired functionality in the application 316 (the application GUI as opposed to the application code). In one common scenario, an application developer seeks out functionality to incorporate into an application 316. For example, a developer wishes to add a sort functionality to his or her application 316 and finds a JavaBean® called Sort to support this function. To integrate functionality of a bean into the application, the application developer creates a UI (User Interface) Description File 314 to give a high level description of the user interface constructs of the third party component 302 in the application 316, such as what icons are available, and what event a particular icon generates. The application developer also creates a callback function 310 as part of application code 312 that provides a communication channel between the user interface aspects of the bean (such as icons), and the application 316, such as what method to invoke, and what the display elements of a particular method call are.

An event 326 is generated when a user clicks on an icon, or some other GUI element, on the client side 300. A UI Description File 314 on the server side 306, which comprises user interface constructs of the third party component, maps the event 326 to a callback function 310. In a preferred embodiment, the callback function 310 is written in application code 312 to initiate method invocation. (It is also possible to initiate method invocation directly from the UI Description File.) The callback function 310 comprises information about a target method, which is a method comprising a method signature (having parameter values) that is to be bound to a resolved method, or a method implementation defined by a third party component. Target method information includes an object handle, method name, and method parameters. Since there can be more than one instance of a third party component 302 running on a given client 300, the callback function comprises an object handle to help determine which third party component 302 instance to communicate with. If a third party component 302 defines many methods having the same name as a target method 322, method overloading resolution must also be performed. Since this determination is made when the method is actually invoked by a user, method overloading resolution is said to be performed at runtime. This means that the application developer did have to write a program in Java to integrate Sort(NameList), and therefore, did not need access to a Java compiler.

The callback function 310 invokes a function to convert any primitive data types into complex data types so that a method Proxy 308 (hereinafter "the Proxy") can serialize the parameters. Complex data types are primitive data types (booleans, bytes, characters, doubles, floats, integers, longs, and shorts) that are wrapped in a Java wrapper (i.e. java.lang.Boolean, java.lang.Byte, java.lang.Character, etc.), which is useful for manipulating primitive data types as objects. This is done by passing the primitive data type into a defined method, which returns a class wrapper for the given data type. Since all objects are subclasses of java.lang.Object, or the Object root class in Java, parameters are placed into an array of Object (Object [ ], to be discussed).

The callback function 310 then invokes the Proxy 308, which comprises a Packager 104 to convert method information into network transmittable data and send network transmittable data over a network 304. Once the network transmittable method information is transmitted over the network 304, it is converted back to application-usable method information by an Extractor 114. In a preferred embodiment, the Resolver 324, which resides on the client 300 side with the application 316, can then use the application-usable method information to resolve the target method 322.

Transmitting Application-Usable Objects Over a Network

The Proxy receives a number which represents an object handle, a string that represents the name of the target method, and an array of Objects. Since in a preferred embodiment, method overloading resolution at runtime occurs in a distributed environment (i.e., the method invocation is remote), the job of the Proxy is to transmit all pieces of the target method across a network so that each piece can be analyzed and the target method can be bound to the correct method. This entails converting the object handle, method name, and method parameters into network transmittable data.

In general, data that is transmitted over a network must be marshalled, or converted into network transmittable data, usually in a series of bits. When the marshalled data is transmitted over a network, it is then demarshalled, or converted back into application-usable objects. In Java, data is marshalled via a serialization feature that converts application-usable data into a network transmittable array of bytes. In Java, an object is serialized by passing it to a writeObject( ) method of an ObjectOutputStream Class, which writes binary representations of an object to a stream. Likewise, an object can be re-created, or deserialized, by passing it to a readObject( ) method of an ObjectIntputStream Class, which reads binary representations of an object from a stream. An object in Java can only be serialized if it implements Java's Serializable interface, which acts as a marker that indicates whether serialization is allowed on a given data type. Basically, virtually all complex data types implement this interface.

The shortcoming of Java's serialization interface is that a single network transmittable object can only be deserialized into a single application-usable object once it is transmitted across the network. Since the object handle and method name are each single objects, Java's. serialization feature can be used to individually transmit these target method objects across a network because each serialized object can be deserialized into its original application-usable object. However, if Java's serialization feature is used on method parameters, there would be no automated way of distinguishing one parameter from another parameter when the objects are deserialized.

To address this problem, the Proxy implements a network protocol that uses Java's serialization feature with a network transmittable container object to support the transmission of multiple objects across a network and the extraction of those objects into application-usable objects. In a preferred embodiment, a network transmittable container object is a two-dimensional array of bytes called an ObamData that stores serialized objects, where a first dimension represents a parameter object, and a second dimension represents a parameter object in its serialized form (i.e., in bytes). For example:

TABLE 1

ObamData

| 10001010 | 10001010 | 10100011 | 10000110 | 00101101 | 010111110 |
|---|---|---|---|---|---|
| 01011010 | 00101000 | 10000011 | 10101000 | 10001001 | 101000100 |
| 01010010 | 11111110 | 11100100 | 11000101 | 10100011 | 001010001 |

TABLE 1-continued

ObamData

| 01001001 | 11101001 | 01010001 | 00011111 | 11111111 | 111111000 |
|---|---|---|---|---|---|
| 01000000 | 01010000 | 11111010 | 10001111 | 10100001 | 101000000 |

TABLE 1 illustrates what an ObamData might look like for a method which has five parameters. In this ObamData, each row (one dimension) corresponds to a serialized parameter by referencing a number of columns (second dimension), and the columns referenced by a single row comprise bytes of the serialized parameter such that each of those columns comprises one byte. While a more realistic ObamData would comprise serialized parameters of different sizes, each serialized parameter of the ObamData in this example is a six byte column for simplicity of illustration. When ObamData data is transmitted over a network, it is transmitted in frames, where each frame can comprise any number of bytes of data stored in ObamData.

To package multiple parameters in an ObamData object, the Proxy passes in a number of application-usable objects (which in a preferred embodiment is stored in a one-dimensional array of Object, Object[ ], supra) as a parameter to method getObamData(Object object[ ]) (a method which accepts a one dimensional array named object comprising elements of type Object) of class ObamDataHelper. Method getObamData(Object object[ ]) calls a method getBytes of class ObamDataHelper to serialize each element in Object[ ] into a network transmittable object and to place the serialized object in ObamData[x][0], where the first dimension is represented by x for a parameter in relative position x (i.e., if x is 0, then position 0 occurs before position 1, etc.), and the second dimension is represented by 0 which refers to the beginning of the serialized object. The number of elements in the second dimension of a given element in the first dimension is dependent on the size of the serialized object. The following is an example of how getObamData is invoked:

// The following are parameters of a target method.
int Intval=3;
float Floatval=4.21;
string Stringname="TEXT":
// Create an array of 3 cells of type Object.
Object[ ] args=new Object[3];
// A Store parameters in an array of Objects, (which gets passed to the Proxy), and convert primitive data types to complex data types. String is already complex.
args[0]=new Integer(Intval);
args[1]=new Float(Floatval);
// Convert the array of Objects to an ObamData.
byte[ ][ ] obamData=getObamData(args)

Thus, where the first element in array args starts at 0, args[0] represents a method parameter in relative position 0, args[1] represents a method parameter in relative position 1, and so forth. Each element of one-dimensional args is then placed in an element of two-dimensional ObamData: args[x] is inserted into ObamData[x][y], where x is an element number in the first dimension that represents a method parameter in relative position x, y is an element in the second dimension that represents a first byte, y+1 represents a second byte, and so forth. If any of the parameters is null, then null is stored in the byte array. This is done for all of the elements in the one-dimensional object array of type Object, such that parameters stored in ObamData are in the same order as the parameters appear in the target method. Once all objects in the one-dimensional array have been serialized into network transmittable data and stored in ObamData, ObamData can be transmitted across a network. Since each parameter is represented by one element of ObamData, an arbitrary number of method parameters can be packaged in a way that allows serialization to take place and stored in a single object (ObamData), and each parameter to be individually deserialized into an application-usable object. Without this protocol, there would be no way to distinguish one parameter from another, or to handle an arbitrary number of parameters or arbitrary types in an automated fashion.

The serialized method information (object handle, method name, and method parameters) is transmitted across a network to a method UISendData of class UIServerImpl. (When an object is serialized, some information about its class is serialized with it so that the correct class file can be loaded when the object is deserialized. This information about the class is represented by the java.io.ObjectStreamClass class.) Method UISendData deserializes the object handle back to its original numeric object, and the method name back to its original String object. It then uses an Extractor which accesses ObamData to extract each network transmittable parameter and deserializes each network transmittable parameter back to its original application-usable object by invoking method getObjects(byte obamData[ ][ ]) of class ObamDataHelper. Method getObjects(byte obamData[ ][ ]) accesses a parameter, x, by accessing element [x][0] in ObamData, and placing it into a one-dimensional array of bytes. Method getObjects(byte obamData[ ][ ]) then invokes method getObject(byte byte[ ]) which takes the one-dimensional array of bytes (which represents a single object, or parameter), deserializes the object (through a Java supported method discussed above), and returns the deserialized object of type Object back to method getObjects(byte obamData[ ][ ]). Method getObjects (byte obamData[ ][ ]) then places the object of type Object into Object[x]. Once this is done for each parameter in ObamData, a one-dimensional array of deserialized, application-usable objects of type Object results, where each element in the array represents a single application-usable parameter, and x is the parameter's relative position. Each application-usable parameter can then be accessed from this array. The actual parameter types are extracted from the one-dimensional array of deserialized objects and placed in an array of Class objects, which is a class that supports special objects that represent Java primitive types. The following is an example of how getObjects is invoked:

// Define a one-dimensional array of Objects. This is where deserialized objects are placed.
Object[ ] args2;
// Place deserialized parameters into args2.
args2=getObjects(ObamData);
// Each object can be extracted (into their complex data types, as shown by capitalized data types).
Integer Intval2=(Integer) args2[0];
Float Floatval2=(Float) args2[1];
String Stringname2=(String) args2[2];

The application-usable method objects can then be used. In a preferred embodiment, method UISendData finds a reference to the object instance that the method is to be invoked upon (using the object handle received by the Proxy), and passes the object instance, method name, and method parameters (as individual objects) to a Resolver. The Resolver is then able to resolve the target method to an implemented method.

Although the network protocol described herein is used in conjunction with Java's serialization, it should be understood that the protocol could also apply to network transmission features other than Java's serialization. This network protocol could equally apply to the a generic application of the marshalling and demarshalling of objects where multiple objects need to be transmitted over a network as a single object. For example, if a network transmission feature required that all objects be marshalled (i.e., packaged for transmission over a network) as an array of bits, a two-dimensional array of bits could be created to support the transmission of multiple parameters over the network and the re-creation of those application-usable objects in a manner described herein.

Furthermore, while the invention has been described herein as operating in a client/server environment, it is to be understood that such description is a preferred embodiment only, and not an exclusive embodiment. It is to be understood that the invention described herein is equally operable between server machines, client machines, host machines, and any combination of such machines thereof.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for implementing a network protocol to support the transmission of a variable number of application-usable objects over a network as a single network transmittable container object and the re-creation of said number of application-usable objects therefrom, comprising:
   a. a number of computer readable media; and
   b. computer readable program code stored on said number of computer readable media, said program code comprising:
      i. program code for marshalling said variable number of application-usable objects into a variable number of marshalled objects, wherein each of said variable number of application-usable objects corresponds to a different one of said variable number of marshalled objects, and each of said variable number of marshalled objects comprises at least one frame of data;
      ii. program code for creating a two-dimensional array, said program code comprising:
         (1) program code for creating a first dimension array comprising a number of elements, wherein each of said number of elements of said first dimension array represents a given one of said variable number of marshalled objects by referencing a second dimension array comprising a number of elements; and
         (2) program code for creating said second dimension array, wherein said number of elements of said second dimension array referenced by said given element of said first dimension array comprise said at least one frame of data of a given one of said variable number of marshalled objects; and
      iii. program code for storing each of said variable number of marshalled objects in said two-dimensional array.

2. An apparatus as in claim 1, wherein said program code for marshalling said variable number of application-usable objects into a variable number of marshalled objects comprises program code for serializing said variable number of application-usable objects into a variable number of serialized objects, wherein each of said variable number of serialized objects comprises at least one byte.

3. An apparatus as in claim 2, wherein said program code for creating a two-dimensional array comprises program code for creating a two-dimensional array of bytes, and program code for creating a two-dimensional array of bytes comprises:
   a. program code for creating a first dimension array comprising a number of elements, wherein each of said number of elements of said first dimension array represents a given one of said variable number of serialized objects by referencing a second dimension array comprising a number of elements; and
   b. program code for creating said second dimension array, wherein said number of elements of said second dimension array referenced by said given element of said first dimension array comprise at least one byte of a given one of said variable number of serialized objects, and each of said number of elements of said second dimension array referenced by said given element of said first dimension array comprise one of at least one byte of a given one of said variable number of serialized objects.

4. An apparatus as in claim 1, additionally comprising:
   a. program code for transmitting said two-dimensional array over a network;
   b. program code for re-creating a variable number of application-usable objects from said two-dimensional array, comprising:
      i. program code for accessing said two-dimensional array to extract each of said variable number of marshalled objects; and
      ii. program code for demarshalling said variable number of marshalled objects into said variable number of application-usable objects.

5. An apparatus as in claim 4, wherein said program code for demarshalling said variable number of marshalled objects into a variable number of application-usable objects comprises program code for deserializing said variable number of application-usable objects into a variable number of application-usable objects.

6. An apparatus as in claim 1, wherein said program code for creating a two-dimensional array comprises program code for creating a two-dimensional array of bytes.

7. An apparatus as in claim 6, wherein said program code for marshalling said variable number of application-usable objects into a variable number of marshalled objects comprises program code for serializing said variable number of application-usable objects into a variable number of serialized objects, wherein each of said variable number of serialized objects comprises at least one byte.

8. An apparatus as in claim 7, wherein said program code for creating a two-dimensional array of bytes comprises:
   a. program code for creating a first dimension array comprising a number of elements, wherein each of said number of elements of said first dimension array represents a given one of said variable number of serialized objects by referencing a second dimension array comprising a number of elements; and
   b. program code for creating said second dimension array, wherein said number of elements of said second dimension array referenced by said given element of said first dimension array comprise at least one byte of a given one of said variable number of serialized objects, and each of said number of elements of said second dimension array referenced by said given element of said first dimension array comprise one of at least one byte of a given one of said variable number of serialized objects.

9. An apparatus as in claim 1, wherein said program code for creating a first dimension array comprising a number of elements comprises program code for creating a first dimension array comprising a number of elements wherein a number associated with a given one of said number of elements of said first dimension array corresponds to a relative position of a variable number of application-usable objects, wherein said application-usable objects are positioned in a particular order.

10. An apparatus for implementing a network protocol to support the transmission of a variable number of application-usable objects over a network as a single network transmittable container object and the re-creation of said number of application-usable objects therefrom, comprising:
   a. a number of computer readable media; and
   b. computer readable program code stored on said number of computer readable media, said program code comprising:
      i. program code for serializing said variable number of application-usable objects into a variable number of serialized objects, wherein each of said variable number of application-usable objects corresponds to a different one of said variable number of serialized objects, and each of said variable number of serialized objects comprises at least one byte;
      ii. program code for creating a two-dimensional array of bytes, said program code comprising:
         (1) program code for creating a first dimension array comprising a number of elements, wherein each of said number of elements of said first dimension array represents a given one of said variable number of serialized objects by referencing a second dimension array comprising a number of elements; and
         (2) program code for creating said second dimension array, wherein said number of elements of said second dimension array referenced by said given element of said first dimension array comprise said at least one byte of said given one of said variable number of serialized objects, whereby each of said number of elements of said second dimension array comprises one of at least one byte of said given one of said variable number of serialized objects; and
      iii. program code for storing said given one of said variable number of serialized objects in said two-dimensional array of bytes.

11. An apparatus as in claim 10, additionally comprising:
   a. program code for transmitting said two-dimensional array of bytes over a network;
   b. program code for re-creating a variable number of application-usable objects from said two-dimensional array of bytes, comprising:
      i. program code for accessing said two-dimensional array of bytes to extract each of said variable number of serialized objects; and
      ii. program code for deserializing each of said variable number of serialized objects into said variable number of application-usable objects.

12. An apparatus as in claim 10, wherein said program code for creating a first dimension array comprising a number of elements comprises program code for creating a first dimension array comprising a number of elements wherein a number associated with a given one of said number of elements of said first dimension array corresponds to a relative position of a variable number of application-usable objects, wherein said application-usable objects are positioned in a particular order.

13. A method for implementing a network protocol to support the transmission of a variable number of application-usable objects over a network as a single network transmittable container object and the re-creation of said number of application-usable objects therefrom, comprising:
- a. marshalling said variable number of application-usable objects into a variable number of marshalled objects, wherein each of said variable number of application-usable objects corresponds to a different one of said variable number of marshalled objects, and each of said variable number of marshalled objects comprises at least one frame of data;
- b. creating a two-dimensional array, comprising:
  - i. creating a first dimension array comprising a number of elements, wherein each of said number of elements of said first dimension array represents a given one of said variable number of marshalled objects by referencing a second dimension array comprising a number of elements; and
  - ii. creating said second dimension array, wherein said number of elements of said second dimension array referenced by said given element of said first dimension array comprise said at least one frame of data of a given one of said variable number of marshalled objects; and
- c. storing said given one of said variable number of marshalled objects in said two-dimensional array.

14. A method as in claim 13, wherein said marshalling said variable number of application-usable objects into a variable number of marshalled objects comprises serializing said variable number of application-usable objects into a variable number of serialized objects, wherein each of said variable number of serialized objects comprises at least one byte.

15. A method as in claim 14, wherein said creating a two-dimensional array comprises creating a two-dimensional array of bytes, and said program code for creating a two-dimensional array of bytes comprises:
- a. creating a first dimension array comprising a number of elements, wherein each of said number of elements of said first dimension array represents a given one of said variable number of serialized objects by referencing a second dimension array comprising a number of elements; and
- b. creating said second dimension array, wherein said number of elements of said second dimension array referenced by said given element of said first dimension array comprise at least one byte of a given one of said variable number of serialized objects, and each of said number of elements of said second dimension array referenced by said given element of said first dimension array comprise one of at least one byte of a given one of said variable number of serialized objects.

16. A method as in claim 13, additionally comprising:
- a. transmitting said two-dimensional array over a network;
- b. re-creating a variable number of application-usable objects from said two-dimensional array, comprising:
  - i. accessing said two-dimensional array to extract each of said variable number of marshalled objects; and
  - ii. demarshalling said variable number of marshalled objects into said variable number of application-usable objects.

17. A method as in claim 13, wherein said demarshalling said variable number of marshalled objects into a variable number of application-usable objects comprises deserializing said variable number of application-usable objects into a variable number of application-usable objects.

18. A method as in claim 13, wherein said creating a two-dimensional array comprises creating a two-dimensional array of bytes.

19. A method as in claim 18, wherein said marshalling said variable number of application-usable objects into a variable number of marshalled objects comprises serializing said variable number of application-usable objects into a variable number of serialized objects, wherein each of said variable number of serialized objects comprises at least one byte.

20. A method as in claim 19, wherein said creating a two-dimensional array of bytes comprises:
- a. creating a first dimension array comprising a number of elements, wherein each of said number of elements of said first dimension array represents a given one of said variable number of serialized objects by referencing a second dimension array comprising a number of elements; and
- b. creating said second dimension array, wherein said number of elements of said second dimension array referenced by said given element of said first dimension array comprise at least one byte of a given one of said variable number of serialized objects, and each of said number of elements of said second dimension array referenced by said given element of said first dimension array comprise one of at least one byte of a given one of said variable number of serialized objects.

21. A method as in claim 13, wherein said creating a first dimension array comprises creating a first dimension array comprising a number of elements wherein a number associated with a given one of said number of elements of said first dimension array corresponds to a relative position of a variable number of application-usable objects, wherein said application-usable objects are positioned in a particular order.

22. A method for implementing a network protocol to support the transmission of a variable number of application-usable objects over a network as a single network transmittable container object and the re-creation of said number of application-usable objects therefrom, comprising:
- a. creating a two-dimensional array of bytes, comprising:
  - i. serializing said variable number of application-usable objects into a variable number of serialized objects, wherein each of said variable number of application-usable objects corresponds to a different one of said variable number of serialized objects, and each of said variable number of serialized objects comprises at least one byte;
  - ii. creating a first dimension array comprising a number of elements, wherein each of said number of elements of said first dimension array represents a given one of said variable number of serialized objects by referencing a second dimension array comprising a number of elements; and
  - iii. creating said second dimension array, wherein said number of elements of said second dimension array referenced by said given element of said first dimension array comprise said at least one byte of said given one of said variable number of serialized objects, whereby each of said number of elements of said second dimension array comprises one of at least one byte of said given one of said variable number of serialized objects; and b. storing said given one of said variable number of serialized objects in said two-dimensional array of bytes.

23. A method as in claim 22, additionally comprising:

a. transmitting said two-dimensional array of bytes over a network;

b. re-creating a variable number of application-usable objects from said two-dimensional array of bytes, comprising:
   i. accessing said two-dimensional array of bytes to extract each of said variable number of serialized objects; and
   ii. deserializing each of said variable number of serialized objects into said variable number of application-usable objects.

24. A method as in claim 22, wherein said creating a first dimension array comprises creating a first dimension array comprising a number of elements wherein a number associated with a given one of said number of elements of said first dimension array corresponds to a relative position of a variable number of application-usable objects, wherein said application-usable objects are positioned in a particular order.

25. An apparatus for implementing a network protocol to support the transmission of a variable number of application-usable objects over a network as a single network transmittable container object and the re-creation of said number of application-usable objects therefrom, comprising:

a. means for marshalling said variable number of application-usable objects into a variable number of marshalled objects, wherein each of said variable number of application-usable objects corresponds to a different one of said variable number of marshalled objects, and each of said variable number of marshalled objects comprises at least one frame of data;

b. means for creating a two-dimensional array; and c. means for storing said given one of said variable number of marshalled objects in said two-dimensional array.

* * * * *

UNITED STATES PATENT AND TRADEMARK OFFICE
CERTIFICATE OF CORRECTION

PATENT NO.    : 6,412,010 B1
DATED         : June 25, 2002
INVENTOR(S)   : Lance Kind It is certified that error appears in the above-identified patent and that said Letters Patent is hereby corrected as shown below:

Title page,
Item [54], delete "APPARATUS AND METHOD FOR IMPLEMENTING A NETWORK PROTOCOL THAT SUPPORTS THE TRANSMISSION OF A VARIABLE NUMBER OF APPLICATION-USABLE OBJECT OVER A NETWORK AS A SINGLE NETWORK TRANSMITTABLE CONTAINER OBJECT AND THE RE-CREATION OF THOSE APPLICATION-USABLE OBJECT THEREFROM" and insert therefor -- SYSTEM FOR IMPLEMENTING NETWORK PROTOCOL FOR SUPPORTING TRANSMISSION OF VARIABLE NUMBER OF APPLICATION-USABLE OBJECTS OVER NETWORK AS SINGLE NETWORK TRANSMITTALBE CONTAINER OBJECT AND RE-CREATION OF APPLICATION-USABLE OBJECTS THEREFROM --

Column 7,
Line 41, after "Java's" delete "."

Column 8,
Line 44, after "TEXT" delete ":" and insert therefor -- ; --
Line 47, after "//" delete "A"

Signed and Sealed this

Tenth Day of December, 2002

JAMES E. ROGAN
*Director of the United States Patent and Trademark Office*